United States Patent [19]

Inoue

[11] Patent Number: 5,013,800

[45] Date of Patent: May 7, 1991

[54] ROOM TEMPERATURE-CURABLE ORGANOPOLYSILOXANE-BASED COATING COMPOSITION

[75] Inventor: Yoshio Inoue, Gunma, Japan

[73] Assignee: Shin-Etsu Chemical Co., Ltd., Tokyo, Japan

[21] Appl. No.: 425,267

[22] Filed: Oct. 23, 1989

[30] Foreign Application Priority Data

Oct. 28, 1988 [JP] Japan ................................ 63-272644

[51] Int. Cl.$^5$ ............................................ C08F 283/00
[52] U.S. Cl. ..................... 525/477; 528/15; 528/16; 528/14; 528/17; 528/18; 528/19; 528/21; 528/22; 528/34; 528/901
[58] Field of Search .................... 525/477; 528/15, 16, 528/17, 14, 18, 19, 21, 22, 34, 901

[56] References Cited

U.S. PATENT DOCUMENTS 4,631,208 12/1986 Westall ................................. 525/477
4,963,626 10/1990 Hirose et al. ........................ 528/34

*Primary Examiner*—Melvyn I. Marquis
*Attorney, Agent, or Firm*—Millen, White & Zelano

[57] ABSTRACT

A novel room temperature-curable organopolysiloxane-based composition is proposed which is capable of giving a surface coating highly insusceptible to surface stain even by exposure over years. The composition comprises: (A) a block copolymer composed of dimethylsiloxane units and trifunctional siloxane units of which the organic group is a phenyl group or a fluorine containing aliphatic group, in a specified molar proportion; (B) an organosilane compound having hydrolyzable groups; and (C) a polyoxyalkylene-modified organosiloxane compound of the formula $(Me_3SiO—)_2SiR^4—C_3H_6—(—O—R^5—)_b—O—SiR^6{}_aX_{3-a}$, in which Me is a methyl group, $R^4$ is a methyl group or trimethylsiloxy group, $R^5$ is an ethylene group or propylene group, $R^6$ is a monovalent hydrocarbon group, X is a hydrolyzable group, the subscript a is zero or 1 and the subscript b is a positive integer not exceeding 50, with optional addition of a condensation catalyst.

5 Claims, No Drawings

ROOM TEMPERATURE-CURABLE ORGANOPOLYSILOXANE-BASED COATING COMPOSITION

BACKGROUND OF THE INVENTION

The present invention relates to a room temperature-curable coating composition, more particularly, to a room temperature-curable organopolysiloxane-based coating composition which is outstandingly free from the problem of surface stain even by prolonged exposure to atmospheric air when it is used as a sealant or coating material in various kinds of structural bodies constructed outdoors, such as buildings.

Various types of room temperature-curable organopolsyiloxane-based compositions are known which give a cured body having rubbery elasticity. By virtue of the excellent heat and cold resistance and high weatherability of such a silicone-based rubbery elastomer, the room temperature-curable organopolsyiloxane-based compositions are widely used as a sealing material and coating material in the construction industry. One of the problems in these rubbery elastomers is that the surface thereof is susceptible to stain when the surface is prolongedly exposed over years to the atmospheric air, blowing wind, rainwater, snow and the like which more or less act as a contaminating medium. When the surface has been badly stained, the aesthetic value of, for example, the building finished by using such a silicone composition is greatly reduced even if the intrinsic performance of the silicone, such as the water-proofing function and the like, is still little decreased.

In view of the above mentioned problem, various attempts and proposals have been made to reduce the surface stain of the cured rubbery body of the silicone-based sealing and coating compositions. For example, Japanese Patent Kokai No. 58-193131, No. 59-126470 and No. 59-227966 propose a method in which the surface of the cured silicone composition is coated with a coating composition comprising an alkyd resin, methacrylate resin or a copolymeric resin thereof with a silicone to form a stain-preventing coating layer. Though excellent in the stain-preventing performance at least in the initial stage, the weatherability of these coating compositions is generally low so that the stain-insusceptibility of the thus coated surface is rapidly lost in the lapse of time and the method hardly provides a practical solution of the problem.

It has also been proposed in Japanese Patent Publication No. 50-36356 that the surface stain of a cured rubbery silicone coating composition can be reduced by modifying the organopolysiloxane itself as the principal ingredient of the composition. For example, a considerable improvement can be obtained by formulating the composition with an organopolysiloxane having a structure of a block copolymer composed of dimethyl siloxane units, phenyl methyl siloxane units, monomethyl siloxane units and monophenyl siloxane units. The stain-insusceptibility of this composition, however, is still insufficient and the surface of the cured composition is badly stained before long. Accordingly, it is eagerly desired to develop a room temperature-curable silicone composition capable of giving a rubbery elastomer by curing which is highly insusceptible to surface stain.

SUMMARY OF THE INVENTION

The present invention accordingly has an object to provide a novel room temperature-curable organopolysiloxane-based composition capable of giving a rubbery elastomer by curing which is highly insusceptible to surface stain even by prolonged exposure to a contaminating medium and to be freed from the above mentioned problems in the prior art.

Thus, the room temperature-curable organopolysiloxane-based composition provided by the invention comprises, in admixture:

(A) 100 parts by weight of an organopolysiloxane block copolymer consisting essentially of (a) from 50 to 85% by moles of diorganosiloxane units represented by the general formula $$R^1_2SiO, \qquad (I)$$

in which each $R^1$ is a substituted or unsubstituted monovalent hydrocarbon group having 1 to 6 carbon atoms, and (b) from 50 to 15% by moles of trifunctional organosiloxane units represented by the general formula $$R^2SiO_{1.5}, \qquad (II)$$

in which $R^2$ is a phenyl group, a 2-(perfluoroalkyl)ethyl group of the general formula $$C_nF_{2n-1}C_2H_4—, \qquad (III)$$

in which the subscript n is a positive integer not exceeding 8, or a fluorine-containing substituted propyl group represented by the general formula $$C_mF_{2m-1}—O—(—CFCF_3—CF_2—O—)_p—C_3H_6—, \qquad (IV)$$

in which the subscript m is a positive integer not exceeding 8 and the subscript p is a positive integer not exceeding 3;

(B) from 1 to 100 parts by weight or, preferably, from 5 to 75 parts by weight of an organosilane compound represented by the general formula $$R^3_aSiX_{4-a}, \qquad (V)$$

in which $R^3$ is a substituted or unsubstituted monovalent hydrocarbon group, X is a hydrolyzable organic group selected from the class consisting of alkoxy groups, ketoxime groups, acyloxy groups, alkenyloxy groups, substituted amino groups, substituted aminoxy groups and amide groups and the subscript a is zero or 1; and (C) from 1 to 100 parts by weight or, preferably, from 2 to 50 parts by weight of an oxyalkylene group-containing organopolysiloxane represented by the general formula $$(Me_3SiO—)_2SiR^4—C_3H_6—(—O—R^5—)_b—O—SiR^6_uX_{3-a}, \qquad (VI)$$

in which Me is a methyl group, $R^4$ is a methyl group or trimethylsiloxy group, $R^5$ is an ethylene group or propylene group, $R^6$ is a monovalent hydrocarbon group, X has the same meaning as defined above, the subscript a has the same meaning as defined above and the subscript b is a positive integer not exceeding 50.

DETAILED DESCRIPTION OF THE PREFERRED EMBODIMENTS

As is described above, the essential ingredients in the inventive composition are the components (A), (B) and (C), for each of which a detailed description is given below.

The component (A) is an organopolysiloxane block-copolymer composed of the diorganosiloxane units of difunctional organosiloxane units and the trifunctional organosiloxane units in a specified molar proportion. The diorganosiloxane unit is represented by the general formula $$R^1_2SiO, \quad (I)$$

in which each $R^1$ is an unsubstituted or substituted monovalent hydrocarbon group having 1 to 6 carbon atoms exemplified by alkyl groups, e.g., methyl, ethyl, propyl and butyl groups, alkenyl groups, e.g., vinyl and allyl groups, and aryl groups, e.g., phenyl group, as well as those substituted hydrocarbon groups obtained by replacing a part or all of the hydrogen atoms in the above named hydrocarbon groups with substituent atoms and/or groups such as halogen atoms, cyano groups and the like, the number of carbon atoms from 1 to 6 including the carbon atoms in the substituent groups, if any, such as chloromethyl, 3,3,3-trifluoropropyl and 2-cyanoethyl groups. It is of course optional that two kinds or more of diorganosiloxane units are contained in the organopolysiloxane block copolymer as the first moiety in the component (A).

The second moiety constituting the organopolysiloxane block copolymer as the component (A) is formed of trifunctional organosiloxane units represented by the general formula $$R^2SiO_{1.5}, \quad (II)$$

in which $R^2$ is a monovalent group bonded to the silicon atom through a carbon-to-silicon linkage. The group denoted by $R^2$ is selected from three classes of groups. The first of the three classes of groups $R^2$ is a phenyl group so that the trifunctional organosiloxane unit is a phenyl siloxane unit of the formula $PhSiO_{1.5}$, in which Ph is a phenyl group. The second of the three classes of groups $R^2$ is a 2-(perfluoroalkyl)ethyl group of the general formula $$C_nF_{2n+1}C_2H_4—, \quad (III)$$

in which the subscript n is a positive integer not exceeding 8, so that the trifunctional organosiloxane unit is expressed by the general formula $C_nF_{2n+1}C_2H_4SiO_{1.5}$. The third of the three classes of groups $R_2$ is a fluorine-containing substituted propyl group represented by the general formula $$C_mF_{2m-1}—O—(—CFCF_3—CF_2—O—)_p—C_3H_b—. \quad (IV)$$

in which the subscript m is a positive integer not exceeding 8 and the subscript p is a positive integer not exceeding 3, so that the trifunctional organosiloxane unit is expressed by the general formula $$C_mF_{2m-1}—O—(—CFCF_3—CF_2—O—)_p—C_3H_bSiO_{1.5}.$$

It is essential that the difunctional and trifunctional organosiloxane units form not a random copolymer but a block copolymer in which the molar proportion of the difunctional units to the trifunctional units is in the range from 50:50 to 85:15 or, preferably, in the range from 60:40 to 80:20. When the molar proportion of the difunctional organosiloxane units is too small, the composition cannot give a cured body having full elasticity rather with brittleness. When the molar proportion of the difunctional organosiloxane units is too large, on the other hand, the relative content of the trifunctional units is decreased so that the desired stain-insusceptibility of the cured composition cannot be fully achieved.

The organopolysiloxane block copolymer as the component (A) can be prepared in the following manner. For example, a chlorine-terminated diorganopolysiloxane represented by the general formula $$Cl—SiR^1_2—(—O—SiR^1_2—)_p—O—SiR^1_2—Cl,$$

in which $R^1$ has the same meaning as defined above and the subscript p is a positive integer in the range from 10 to 1000, is reacted with a hydrolysis product of a trichlorosilane of the general formula $R^2SiCl_3$, in which $R^2$ has the same meaning as defined above, in the presence of a hydrogen chloride acceptor such as triethyl amine and the reaction product is freed from the hydrogen chloride of the amine by washing with water followed by a dehydration condensation reaction in the presence of a condensation catalyst such as an organic tin compound to give the desired block copolymer in the form of a clear and uniform liquid or solid.

The component (B) comprised in the inventive composition is an organosilane compound represented by the general formula (V) given above. The group $R^3$ in the formula is a substituted or unsubstituted monovalent hydrocarbon group having 1 to 6 carbon atoms. The group denoted by X is a hydrolyzable group selected from the class consisting of alkoxy groups, ketoxime groups, acyloxy groups, alkenyloxy groups, substituted amino groups, substituted aminoxy groups and amide groups. The subscript a in the formula is zero or 1.

Particular examples of the organosilane compound suitable as the component (B) include those expressed by the following formulas, in which the symbols of Me, Vi, Et and Ph denote methyl, vinyl, ethyl and phenyl groups, respectively:

Si(O—CO—Me)$_4$;  ViSi(O—CO—Me)$_3$; MeSi(O—CO—Me)$_3$;
PhSi(O—CO—Me)$_3$; Si(O—N=CMeEt)$_4$; ViSi(O—N=CMeEt)$_3$;
MeSi(O—N=CMeEt)$_3$; PhSi(O—N=CMeEt)$_3$; MeSi(OMe)$_3$;
ViSi(OMe)$_3$; PhSi(OMe)$_3$; ViSi(OEt)$_3$; Si(OEt)$_4$; Si(OMe)$_4$;
PhSi(O—CMe=CH$_2$)$_3$; Si(O—CMe=CH$_2$)$_4$;
ViSi(O—CMe=CH$_2$)$_3$; MeSi(O—CMe=CH$_2$)$_3$;
CF$_3$C$_2$H$_4$Si(O—CMe=CH$_2$)$_3$;  ViSi(NEt$_2$)$_3$; MeSi(O—NEt$_2$)$_3$;
MeSi(NPh—CO—Me)$_3$;  and  ViSi(NMe—CO—Me)$_3$.

These organosilane compounds can be used either singly or as a combination of two kinds or more according to need. A partial hydrolysis product of the silane compound or compounds are also suitable as the component (B). The amount of the component (B) in the inventive composition is in the range from 1 to 100 parts by weight or, preferably, in the range from 5 to 75 parts by weight per 100 parts by weight of the component (A). When the amount of the component (B) is too small, curing of the composition by the cross-linking reaction with the atmospheric moisture would be insufficient. When the amount thereof is too large, on the other hand, the composition after curing is too hard and brittle due to the excessively large crosslinking density.

The component (C) comprised in the inventive composition is an oxyalkylene group-containing organopolysiloxane represented by the general formula

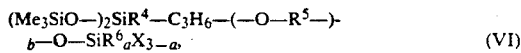
(VI)

in which Me is a methyl group, $R^4$ is a methyl group or trimethylsiloxy group, $R^5$ is an ethylene group or propylene group, $R^6$ is a monovalent hydrocarbon group, X has the same meaning as defined above for the component (B), the subcript a has the same meaning as defined above and the subscript b is a positive integer not exceeding 50.

The organopolysiloxane as the component (C) can be prepared, for example, in the following manner. Thus, an SiH-containing trisiloxane compound represented by the general formula

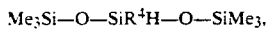

in which each symbol has the same meaning as defined above, is reacted with a polyoxyalkylene glycol monoallyl ether represented by the general formula

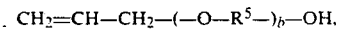

in which each symbol has the same meaning as defined above, in the presence of a hydrosilation catalyst such as a platinum compound to give a product of the hydrosilation reaction represented by the general formula

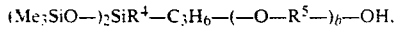

which is then reacted with an organosilane compound represented by the general formula

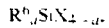

in which each symbol has the same meaning as defined above.

When the inventive composition containing the component (C) having hydrolyzable groups X in the molecule is cured by standing at room temperature, the molecules of the component (C) are incorporated into the network structure of the crosslinked composition as a pendant group expressed by the formula

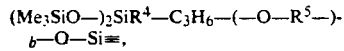

of which the linkage of $-R^5-O-Si\equiv$ is also susceptible to hydrolysis. When a cured coating film of the inventive composition is exposed to moisture-containing atmosphere, accordingly, the moiety of the component (C) bonded to the network structure is liberated by the hydrolysis reaction taking place on the linkage of $-R^5-O-Si\equiv$ so that bleeding of the compound of the formula

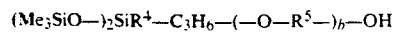

takes place on the surface of the cured coating film. Since this compound has surface activity, any stain deposited on the surface of the cured coating film is washed away together with this compound as the stain is deposited. This is a presumable mechanism for the outstanding insusceptibility of the cured coating film of the inventive composition to surface stain. The silicon-bonded phenyl groups, fluoroalkyl groups and fluoroalkyl ether groups may also contribute to enhance the stain-insusceptibility of the composition.

The amount of the component (C) in the inventive composition is in the range from 1 to 100 parts by weight or, preferably, from 2 to 50 parts by weight per 100 parts by weight of the component (A). When the amount of the component (C) is too small, the desired stain-reducing effect cannot be fully exhibited. When the amount thereof is too large, on the other hand, certain adverse influences are caused on the properties of the cured coat-ing film of the composition such as a decrease in the clarity and/or hardness of the coating film.

The room temperature-curable coating composition of the invention can be obtained by uniformly blending the above described components (A), (B) and (C) each in a specified amount under an anhydrous condition. Although the composition composed of the components (A), (B) and (C) alone is curable at room temperature when it is applied to a substrate surface and exposed to atmospheric air, it is optional with an object to promote curing of the composition that the composition is further admixed with a catalytic compound as the component (D) which promote the crosslinking reaction between the component (A) and the components (B) and (C).

Examples of suitable crosslinking catalysts include: metal salts of carboxylic acids such as lead 2-ethylhexoate, dibutyl tin diacetate, dibutyl tin dilaurate, butyl tin tri(2-ethylhexoate), iron 2-ethylhexoate, cobalt 2-ethylhexoate, zinc 2-ethylhexoate, manganese 2-ethylhexoate, tin (II) caprylate, tin naphthenate, tin oleate, tin butyrate, titanium naphthenate, zinc naphthenate, cobalt naphthenate, zinc stearate and the like; organic titanate esters such as tetrabutyl titanate, tetra(2-ethylhexyl) titanate, triethanolamine titanate, tetra(isopropenyloxy) titanate and the like; organotitanium compounds such as organotitanosiloxanes and the like; alkoxy aluminum compounds; aminoalkyl group-substituted alkoxy silane compounds such as 3-aminopropyl triethoxy silane, N-(3-trimethoxysilylpropyl) ethylene diamine and the like; amine compounds and salts thereof such as hexyl amine, dodecylamine phosphate and the like; quaternary ammonium salts such as benzyl triethyl ammonium acetate and the like; alkali metal salts of lower carboxylic acids such as potassium acetate, sodium acetate, lithium oxalate and the like; dialkyl hydroxylamines such as dimethyl hydroxylamine, diethyl hydroxylamine and the like; guanidine compounds such as tetramethylguanidinopropyl trimethoxy silane and the like; and so on. When added, the amount of the crosslinking catalyst as the component (D) should not exceed 30 parts by weight per 100 parts by weight of the component (A).

It is optional that the inventive composition, of which the essential ingredients are the components (A), (B) and (C) along with the optional component (D), is further admixed with various kinds of known additives according to need including organic solvents, plasticizers, coloring agents, e.g., pigments, heat-resistance or cold-resistance improvers, flame-retardants, antifungal agents, dehydrating agents, silane coupling agents, adhesion improvers, ultraviolet absorbers, aging retarders, antioxidants and the like each in a limited amount. When modification of the surface properties of the cured coating film of the inventive composition is desired the composition may be admixed with an organosiloxane-oxyalkylene copolymer or a so-called polyether-modified silicone which is a hydrophilic compound having surface active groups. When improvement in the mechanical properties of the cured coating film of the composition is desired, the composition may be compounded with a particulate or fibrous filler such as a fumed silica filler, precipitated silica filler, fine quartz powder, diatomaceous earth, calcium carbonate, magnesium carbonate, carbon black, clay, calcined clay, titanium dioxide, zinc oxide, iron oxide, bentonite, fine glass powder, glass microballons, i.e. tiny hollow glass spheres, asbestos, glass fibers and the like.

In the following, the room temperature-curable organopolysiloxane composition of the invention is described in more detail by way of examples as being preceded by the description of the synthetic procedures for the preparation of the components (A), (B) and (C). In the following description, the term of "parts" always refers to "parts by weight".

SYNTHETIC PREPARATION 1

A chlorine-terminated dimethylpolysiloxane was prepared in the following manner. Thus, 296 g of octamethyl cyclotetrasiloxane and 1.29 g of dimethyl dichlorosilane were introduced into a flask and the mixture was admixed under exclusion of atmospheric moisture with 15 g of concentrated sulfuric acid and agitated at 20° C. for 5 hours to give a reaction product having a viscosity of 6000 centistokes at 20° C. which was a dimethylpolysiloxane terminated at each molecular chain end with a chlorine atom and expressed by the structural formula Cl—SiMe$_2$—O—(—SiMe$_2$—O—)$_{400}$—SiMe$_2$—Cl, in which Me is a methyl group. The reaction product was admixed with 297.3 g of toluene under agitation and the mixture was kept standing for a while so that the sulfuric acid separated from the mixture sunk to the bottom of the vessel. The thus separated sulfuric acid was removed by phase separation to give a toluene solution of the dimethylpolysiloxane in a concentration of 50% by weight.

SYNTHETIC PREPARATION 2

A trifluoropropyl-containing dimethylpolysiloxane was prepared in the following manner. Thus, 156 g of 1,3,5-tri(3,3,3-trifluoropropyl)-1,3,5-trimethyl cyclotrisiloxane, 74 g of octamethyl cyclotetrasiloxane and 2.58 g of dimethyl dichlorosilane were introduced into a flask and the mixture in the flask was admixed with 6.0 g of trifluoromethane sulfonic acid as a catalyst and heated at 80° C. for 5 hours with agitation under exclusion of atmospheric moisture to give a reaction product having a viscosity of 650 centistokes at 20° C. which was a chlorine-terminated diorganopolysiloxane expressed by the formula Cl—SiMe$_2$—O—[—SiMe(C$_2$H$_4$CF$_3$)—O—]$_5$-
—(—SiMe$_2$—O—)$_{50}$—SiMe$_2$—Cl.

SYNTHETIC PREPARATION 3

A cohydrolysis product of a fluoroalkyl trichlorosilane and phenyl trichlorosilane was prepared in the following manner. Thus, 87.2 g of 2-(perfluorooctyl)ethyl trichlorosilane and 74.0 g of phenyl trichlorosilane were introduced into a flask together with 663.5 g of methyl isobutyl ketone to form a uniform solution of the silanes. This silane solution was gradually added dropwise to a mixture of 301 g of water and 30 g of isopropyl alcohol kept at a temperature of 30° C. or below to effect cohydrolysis of the silanes followed by further continued agitation for additional 1 hour at room temperature. The reaction mixture was kept standing to be separated into two layers and the aqueous solution was discarded. The organic solution was repeatedly washed with water to neutrality. The thus obtained organic solution in methyl isobutyl ketone contained 15% by weight of the cohydrolysis product of the two organosilanes.

SYNTHETIC PREPARATION 4

A hydrolysis product of phenyl trichlorosilane was prepared in the following manner. Thus, a solution of 211.5 g of phenyl trichlorosilane in 731 g of toluene was gradually added dropwise to a mixture of 730 g of water and 22 g of isopropyl alcohol in a flask kept at a temperature of 30° C. or below to effect hydrolysis of the silane followed by further continued agitation for additional 1 hour at room temperature. The reaction mixture was kept standing to be separated into two layers and the aqueous solution was discarded. The organic solution was repeatedly washed with water to neutrality. The thus obtained organic solution in toluene contained 15% by weight of the hydrolysis product of the phenyl trichlorosilane.

SYNTHETIC PREPARATION 5

A cohydrolysis product of a perfluoroalkyl ether trichlorosilane and pjenyl trichlorosilane was prepared in the following manner. Thus, 52.8 g of a perfluoroalkyl ether trichlorosilane of the formula C$_3$F$_7$—O—CFCF$_3$—CF$_2$—O—C$_3$H$_6$SiCl$_3$ and 190.4 g of phenyl trichlorosilane were dissolved in 827.5 g of methyl isobutyl ketone and the solution was gradually added dropwise to a mixture of 530 g of water and 53 g of isopropyl alcohol in a flask kept at a temperature not exceeding 30° C. to effect the hydrolysis reaction of the silanes followed by further continued agitation of the mixture for additional 1 hour at room temperature. The mixture was kept standing to be separated into two layers of which the aqueous solution was discarded and the organic solution was repeatedly washed with water to neutrality followed by dehydration. The thus obtained solution contained 15% by weight of the cohydrolysis product of the silanes.

SYNTHETIC PREPARATION 6

An organosiloxane block copolymer, referred to as the block copolymer I hereinbelow, used as the component (A) in the inventive composition was prepared in the following manner. Thus, 312 g of the solution obtained in Synthetic Preparation 3 described above containing 15% by weight of the cohydrolysis product of the silane mixture and 5 g of triethyl amine were introduced into a flask to form a uniform solution, to which 119 g of the 50% toluene solution of the chlorine-terminated dimethylpolysiloxane obtained in Synthetic Preparation 1 described above were added dropwise taking 30 minutes to effect the dehydrochlorination reaction. After completion of the reaction, the reaction mixture was diluted by adding 277 g of methyl isobutyl ketone and further admixed with 500 g of a 3% hydrochloric acid. After agitation for 30 minutes at room temperature, the mixture was kept standing to be separated into two layers and the aqueous solution containing the hydrochloride of triethyl amine was discarded and the organic solution was repeatedly washed with water to neutrality followed by dehydration.

The organic solution was admixed with 0.5 g of dibutyl tin dilaurate and heated for 3 hours at 117° C. under reflux of methyl isobutyl ketone azeotropically removing the water produced by the condensation reaction to give a clear solution having a viscosity of 7.8 centistokes at 25° C. which contained 14.2% by weight of a non-volatile matter as the block copolymer as determined by evaporating the volatile matter at 105° C. for 3 hours.

SYNTHETIC PREPARATION 7

An organosiloxane block copolymer, referred to as the block copolymer II hereinbelow, used as the component (A) in the inventive composition was prepared in the following manner. Thus, 108 g of the toluene solution obtained in Synthetic Preparation 4 described above, which contained 15% by weight of a hydrolysis product of phenyl trichlorosilane, and 5 g of triethyl amine were introduced into a flask to form a uniform solution, to which 58 g of the trifluoropropyl-containing organopolysiloxane obtained in Synthetic Preparation 2 described above were added dropwise at room temperature taking 30 minutes to effect the dehydrochlorination reaction. The reaction mixture after completion of the reaction was diluted by adding 330 g of methyl isobutyl ketone.

Thereafter, the reaction mixture was further admixed with 200 g of a 3% hydrochloric acid and agitated for 30 minutes at room temperature followed by standing to be separated into two layers. The aqueous solution containing the hydrochloride of triethyl amine was discarded and the organic solution was repeatedly washed with water to neutrality followed by dehydration.

The organic solution was admixed with 1 g of dibutyl tin dioctoate and heated at 117° C. under reflux of the solvent for 4 hours azeotropically removing the water produced by the condensation reaction to give a clear solution having a viscosity of 6.5 centistokes at 25° C. which contained 14.4% by weight of a non-volatile matter as the block copolymer as determined by evaporating the volatile matter at 105° C. for 3 hours.

SYNTHETIC PREPARATION 8

A further organosiloxane block-copolymer, referred to as the block copolymer III hereinbelow, was prepared in the following manner. Thus, 320 g of the methyl isobutyl ketone solution obtained in Synthetic Preparation 5 containing 15% by weight of the cohydrolysis product of the silanes were admixed with 5 g of triethyl amine. The mixture was admixed with 104 g of the 50% toluene solution of the chlorine-terminated dimethylpolysiloxane obtained in Synthetic Preparation 1 and agitated for 30 minutes at room temperature to effect the dehydrochlorination reaction followed by dilution with addition of 242 g of methyl isobutyl ketone. The mixture was further admixed with 500 g of a 3% hydrochloric acid and agitated for 30 minutes to dissolve the triethyl amine hydrochloride. The mixture was kept standing to be separated into two layers, of which the aqueous solution was discarded and the organic solution was repeatedly washed with water to neutrality followed by dehydration.

The thus obtained organic solution was admixed with 0.5 g of dibutyl tin dilaurate and heated for 3 hours under reflux of methyl isobutyl ketone to effect the condensation reaction azeotropically removing the condensation water so that a clear solution was obtained which had a viscosity of 8.7 centistokes at 25° C. and contained 14.8% by weight of non-volatile matter as determined by heating at 105° C. for 3 hours.

SYNTHETIC PREPARATION 9

An oxyethylene-modified organosiloxane, referred to as the oxyethylene-siloxane hereinbelow, used as the component (C) in the inventive composition was prepared in the following manner. Thus, 204 g of a polyoxyethylene glycol monoallyl ether expressed by the structural formula $CH_2=CH-CH_2-(-O-C_2H_4-)_8-OH$, 300 g of isopropyl alcohol, 0.5 g of a 2% isopropyl alcohol solution of chloroplatinic acid and 1 g of potassium acetate were introduced into a flask to form a uniform solution which was heated up to the refluxing temperature of isopropyl alcohol at 83° C. Into the solution under reflux were gradually added dropwise 111 g of $1,1,1,-3,5,5,5$-heptamethyl trisiloxane to effect the hydrosilation reaction followed by continued agitation for additional 4 hours until complete disappearance of the silicon-bonded hydrogen atoms in the $1,1,1,3,-5,5,5$-heptamethyl trisiloxane.

The reaction mixture was then subjected to stripping of isopropyl alcohol by heating at 110° C. under a reduced pressure of 10 mmHg to give 310 g of a liquid product having a viscosity of 55 centistokes at 25° C., specific gravity of 1.03 and refractive index of 1.4462. This product could be assumed to be an addition product of the polyoxyethylene glycol monoallyl ether and the trisiloxane compound expressed by the formula

$(Me_3Si-O-)_2SiMe-C_3H_6(-O-C_2H_4-)_8-OH$, in which Me is a methyl group. This oxyethylene-modified trisiloxane compound was admixed with 151 g of an oxime silane of the formula $MeSi(O-N=CMeEt)_3$, in which Me and Et denote methyl and ethyl groups, respectively, and the mixture was agitated at room temperature for 3 hours followed by stripping of the methyl ethyl ketoxime produced by the reaction to give a liquid product having a viscosity of 73 centistokes at 25° C., specific gravity of 1.02 and refractive index of 1.448. This product could be assumed to be an oxyethylene-modified methyl polysiloxane of the formula

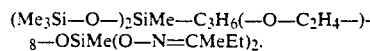

$(Me_3Si-O-)_2SiMe-C_3H_6(-O-C_2H_4-)_8-OSiMe(O-N=CMeEt)_2$.

EXAMPLES 1 to 5

Five organopolysiloxane compositions, referred to as the compositions I to V hereinbelow, were prepared in Examples 1 to 5, respectively, each by uniformly blending 100 parts, calculated for the amount of the solution, of the block copolymer I (compositions I to III) or II (compositions IV and V) obtained in Synthetic Preparations 6 and 7, respectively, as the component (A), 2 parts (compositions I to III) or 3 parts (compositions IV and V) of the same oxime silane as used in Synthetic Preparation 9 described above as the component (B), 1 part (compositions II and IV) or 2 parts (compositions III and V) of the oxyethylene-siloxane obtained in Synthetic Preparation 9 as the component (C) and 0.1 part of dibutyl tin dioctoate (compositions I to V) as the component (D). The composition I was for comparative purpose by omitting the component (C).

Test panels having a uniform undercoating layer of a room temperature-curable silicone rubber-based coating agent (S-Coat 57, a product by Shin-Etsu Chemical Co.) as cured at room temperature were each coated with one of the above prepared compositions I to V in a coating thickness of 200 μm and exposed outdoors to atmospheric air to be examined for the changes in the surface condition of stain in the lapse of time. The results were that the test panels coated with one of the compositions II to V remained each as clean as at the start of the exposure test even after 3 years of exposure. On the other hand, the test panel coated with the composition I had noticeable, though not intolerable, surface stain already after exposure of 1 year without further accumulation of stain thereafter down to 3 years from the start of the exposure test. As a control test, another test panel undercoated in the same manner as above but without coating with any of the compositions I to V was exposed in parallel. The result was that the surface was badly stained already after three months from the start of the exposure test.

EXAMPLE 6

A coating composition was prepared in the same formulation as for the composition V described above excepting omission of the dibutyl tin dioctoate and subjected to the outdoor exposure test of test panels coated therewith in the same manner as in Examples 1 to 5 to find that the surface of the test panels were as clean as in Examples 2 to 5 after 3 years from the start of the exposure test.

EXAMPLE 7

A coating composition was prepared in the same formulation as for the composition V excepting replacement of the block copolymer II with the same amount of the block copolymer III prepared in Synthetic Preparation 8 and subjected to the outdoor exposure test of test panels coated therewith in the same manner as in Examples 1 to 5 to find that the surface of the test panels were as clean as in Examples 2 to 5 after 3 years from the start of the exposure test.

What is claimed is:

1. A room temperature-curable organopolysiloxane-based composition which comprises, in admixture:
   (A) 100 parts by weight of an organopolysiloxane block copolymer consisting essentially of
      (a) from 50 to 85% by moles of diorganosiloxane units represented by the general formula $R^1_2SiO$, in which each $R^1$ is a substituted or unsubstituted monovalent hydrocarbon group having 1 to 6 carbon atoms, and (b) from 50 to 15% by moles of trifunctional organosiloxane units represemnted by the general formula $R^2SiO_{1.5}$, in which $R^2$ is a phenyl group, a 2-(perfluoroalkyl)ethyl group of the general formula $C_nF_{2n+1}C_2H_4-$, in which the subscript n is a positive integer not exceeding 8, or a fluorine-containing substituted propyl group represented by the general formula $C_mF_{2m+1}-O-(-CFCF_3-CF_2-O-)_p-C_3H_6-$, in which the subscript m is a positive integer not exceeding 8 and the subscript p is a positive integer not exceeding 3;
   (B) from 1 to 100 parts by weight of an organosilane compound represented by the general formula $R^3_aSiX_{4-a}$, in which $R^3$ is a substituted or unsubstituted monovalent hydrocarbon group, X is a hydrolyzable organic group selected from the class consisting of alkoxy groups, ketoxime groups, acyloxy groups, alkenyloxy groups, substituted amino groups, substituted aminoxy groups and amide groups and the subscript a is zero or 1; and
   (C) from 1 to 100 parts by weight of an oxyalkylene group-containing organopolysiloxane represented by the general formula $(Me_3SiO-)_2SiR^4-C_3H_6-(-O-R^5-)_b-O-SiR^6_aX_{3-a}$, in which Me is a methyl group, $R^4$ is a methyl group or trimethylsiloxy group, $R^5$ is an ethylene group or propylene group, $R^6$ is a monovalent hydrocarbon group, X has the same meaning as defined above, the subscript a has the same meaning as defined above and the subscript b is a positive integer not exceeding 50.

2. The room temperature-curable organopolysiloxane-based composition as claimed in claim 1 which further comprises:
   (D) up to 30 parts by weight, per 100 parts by weight of the component (A), of a condensation catalyst.

3. The room temperature-curable organopolysiloxane-based composition as claimed in claim 1 wherein the amount of the component (B) is in the range from 5 to 75 parts by weight per 100 parts by weight of the component (A).

4. The room temperature-curable organopolysiloxane-based composition as claimed in claim 1 wherein the amount of the component (C) is in the range from 2 to 50 parts by weight per 100 parts by weight of the component (A).

5. The room temperature-curable organopolysiloxane-based composition as claimed in claim 1 wherein the molar proportion of the difunctional organosiloxane units to the trifunctional organosiloxane units in the component (A) is in the range from 60:40 to 80:20.

* * * * *